United States Patent [19]

Schmale et al.

[11] Patent Number: 4,884,845
[45] Date of Patent: Dec. 5, 1989

[54] CONTINUOUSLY VARIABLE ADJUSTABLE HINGE

[76] Inventors: Gerhard Schmale, 5609 Huckeswagen, Jung-Stilling-Str. 68; Frank Gerich, 5630 Remscheid, Strucker Str. 67, both of Fed. Rep. of Germany; Rudolph C. Barda, 60 Brookfield Ct., Battle Creek, Mich. 49015

[21] Appl. No.: 324,969

[22] Filed: Mar. 20, 1989

Related U.S. Application Data

[63] Continuation-in-part of Ser. No. 237,713, Aug. 29, 1988, abandoned.

[51] Int. Cl.⁴ .......................... A47C 1/026; B60N 1/06
[52] U.S. Cl. .................................... 297/367; 297/355; 297/356
[58] Field of Search ............... 297/354, 367, 368, 369, 297/355

[56] References Cited

U.S. PATENT DOCUMENTS 3,479,088 11/1986 Bonnaud .......................... 297/366 X
4,466,661 8/1984 Narita ............................. 297/366 X
4,591,207 5/1986 Nithammer ....................... 297/366
4,660,886 4/1987 Terada et al. ...................... 297/367

FOREIGN PATENT DOCUMENTS

2322207 11/1974 Fed. Rep. of Germany ...... 297/367

Primary Examiner—James T. McCall
Attorney, Agent, or Firm—Lloyd M. Forster

[57] ABSTRACT

Continuously adjustable pivoted hinge, such as employed for automotive vehicle recliner seat back, wherein a toothed sector on one hinge element is retained by a toothed pawl on the other which has freedom of mounting connection at least equal to the pitch of one tooth in order to accommodate full tooth engagement for any continuously variable relative position of the sector. A pair of pivotally anchored cam elements engage angularly related cam surfaces on the pawl after its full tooth engagement with the sector. Variable travel of cam surface to accommodate fully engaged prepositioned pawl with self-locking angle resisting pawl displacement in either angular direction from sector tooth pressure, is sufficient to accommodate at least one tooth displacement of the pawl in order to lock the pawl in any position of initial full tooth engagement. The pawl is pivotally mounted at the hinge pivot with a radial slot to accommodate tooth disengagement.

33 Claims, 10 Drawing Sheets

| ∠α | ∠β |
|---|---|
| 75° | 5.7° |
| 70° | 6.2° |
| 65° | 6.7° |
| 60° | 7.2° |
| 55° | 7.7° |

CONTINUOUSLY VARIABLE ADJUSTABLE HINGE

This application is a file wrapper continuation-in-part of copending application, Ser. No. 237,713, filed on Aug. 29, 1988, now abandoned.

BACKGROUND OF THE INVENTION

A continuously variable adjustable hinge construction similar to that of the present application is disclosed in U.S. Pat. No. 4,591,207 issued on May 27, 1986. With particular reference to the embodiment illustrated in FIGS. 1 and 2, a continuously adjustable hinge is disclosed, such as employed for an automotive vehicle recliner seat back, wherein a toothed sector on one hinge element is retained by a toothed pawl on the other with preliminary freedom of arcuate float in its mounting at least equal to the pitch of one tooth in order to accommodate full tooth engagement for any continuously variable relative position of the sector. A pair of pivotally anchored cam elements engage right-angle related cam surfaces on the pawl at any full tooth engagement position of the sector. Variable engagement by each cam surface accommodates any fully engaged pawl position with a self-locking angle preventing pawl displacement in either angular direction from sector tooth pressure. A laterally positioned pivot for the pawl having a slotted clearance accommodates angular displacement of the pawl of approximately one tooth in either direction from a neutral position.

SUMMARY OF THE PRESENT INVENTION

An improved embodiment is disclosed wherein a toothed sector engaging toothed pawl is rigidly secured between a pair of links which extend to a pivotal connection coincident with the main hinge and sector pivot with an elongated radial slot accommodating radial displacement of the pawl teeth from the sector for adjustment of the seat back angle to any continuously variable position. Cam engaageable pawl flats are disposed at a 60° included angle and pivotal cam arcs of critical form and position, together with sandwich mounting between a pair of lower bracket side plates of the interengaging locking elements, have been found to provide dependable operation over extended life cycling under maximum loaded conditions.

A second improved embodiment is disclosed wherein one of the pivotally anchored cam elements has a cam rise extending in an opposite angular direction from that of the first embodiment; wherein pawl teeth of approximately 50° included angle are provided with two sharp tips of approximately 120° included angle; and wherein dual cam actuation and pawl release are effected by a different and unique pivoted linkage system.

DESCRIPTION OF FIRST EMBODIMENT

Figure 1:
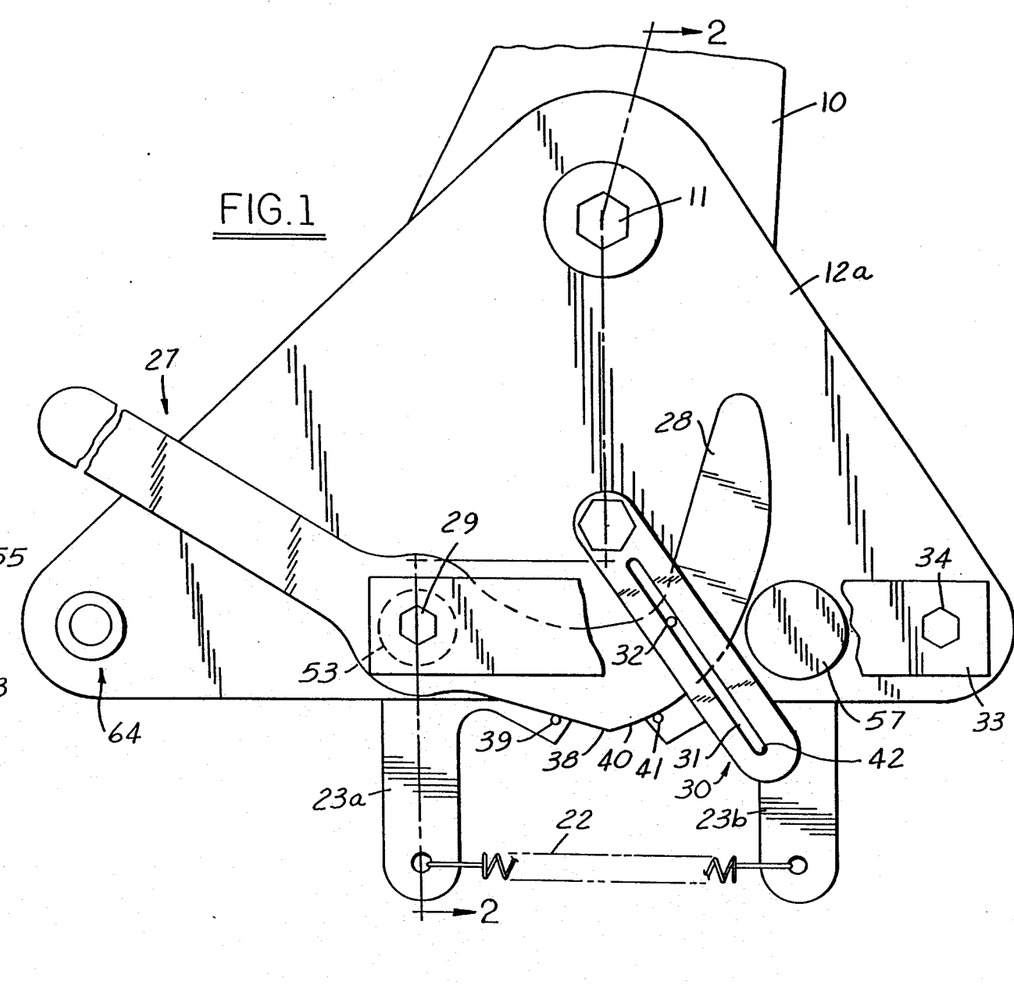
FIG. 1 is a side elevation of a hinge assembly illustraating a first embodiment of the present invention.
Figure 2:
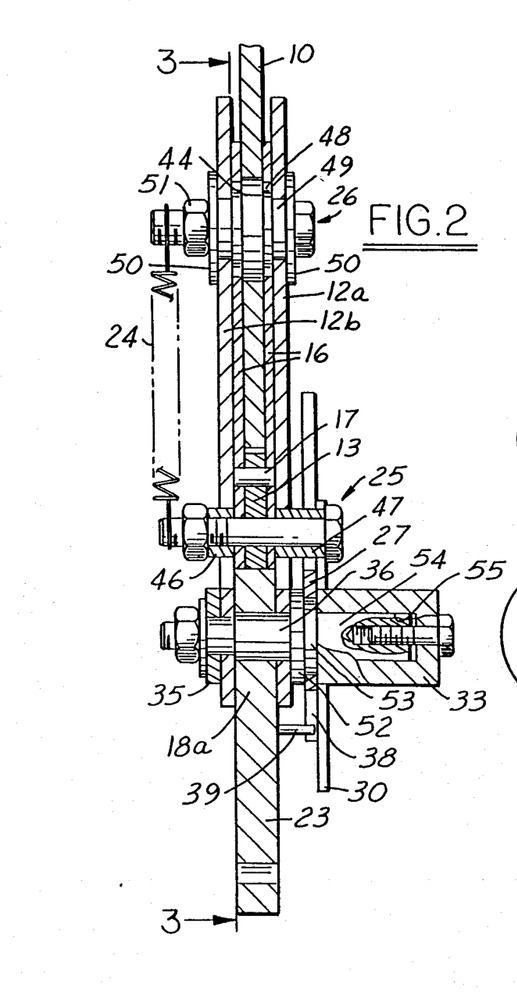
FIG. 2 is a sectional view taken along the line 2—2 of FIG. 1.
Figures 3, 4:
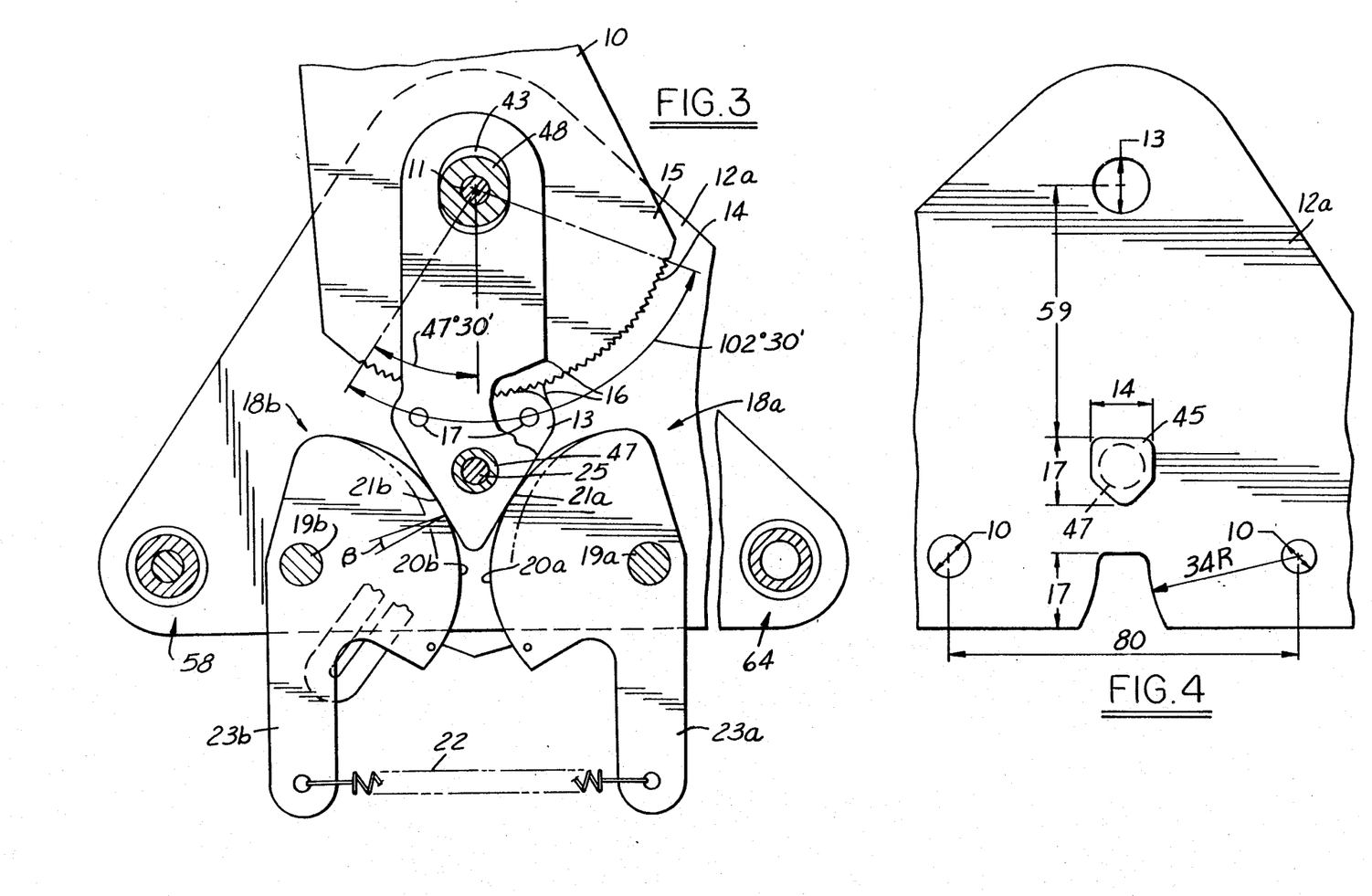
FIG. 3 is a sectional side elevation taken along the line 3—3 of FIG. 2.
FIG. 4 is a fragmentary view of one of the lower bracket side plates per se illustrated in the assembly view of FIG. 1.

With reference to FIGS. 1, 2, and 3, components of the present continuously variable reliner hinge include sector plate upper bracket 10 pivotally connected at 11 to a pair of lower bracket side plates 12a and 12b; toothed latch pawl 13 engaging matching teeth 14 formed on the lower sector end 15 of bracket 10; a pair of pull anchor side links 16 pinned at 17 to pawl 13; a pair of identical eccentric disk cams 18a and 18b pivotally connected respectively at 19a and 19b to plates 12a and 12b having cam surfaces 20a and 20b engaging respectively straight flat coplanar surfaces 21a and 21b of pawl 13 and matching ends of links 16; spring 22 connected to cam arms 23a and 23b urging cam surfaces 20a and 20b into respective pawl engagement; spring 24 connected to ends of bolt 25 passing through pawl 13 and links 16; bolt 26 passing through upper bracket 10, links 16 and lower side bracket plates 12a and 12b at pivotal connection 11; release hand lever 27 with cam extension 28 pivotally connected to plates 12a and 12b at 29, coinciding with pivot 19a of cam 18a; release link 30 having slot 31 engaged by pin 32 projecting from release lever cam extension 28; retention link 33 extending between pivot 19a for cam 18a and bolt connector 34 for side plates 12a and 12b; connection link 35 extending between pivot connections 19; and assembly shoulder bolts 36 and 37.

Figure 3A:
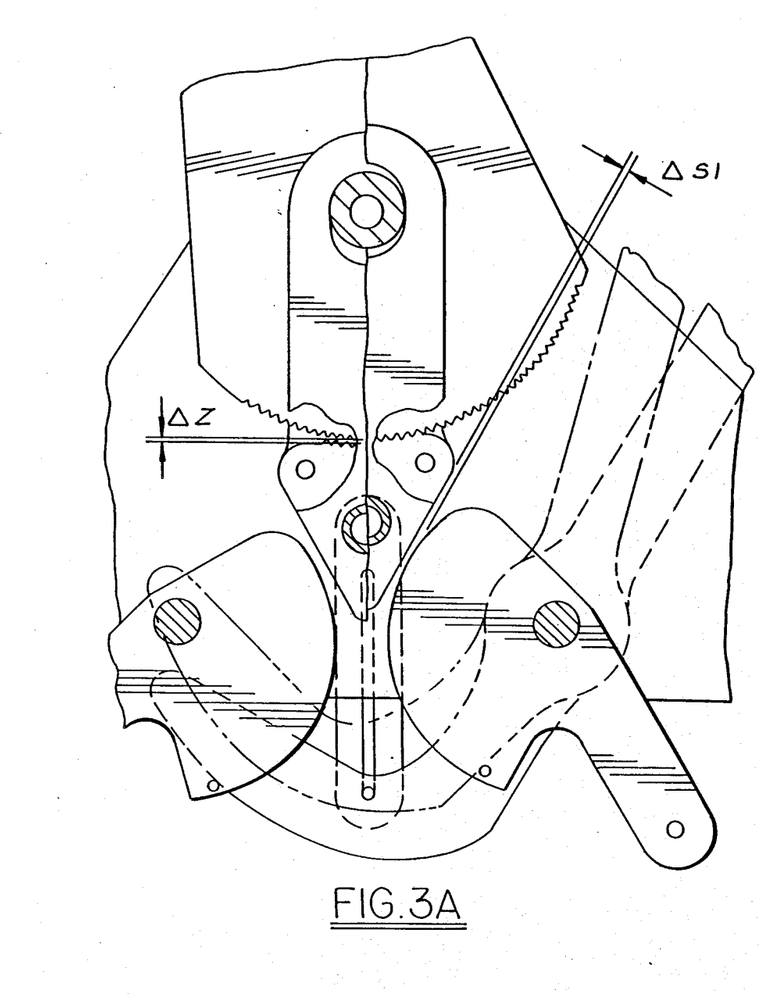
FIG. 3A is a similar view illustrating cam and pawl retraction for sector adjustment.

As shown in FIG. 1, straight edge surface 38 of extension 28 engages pin 39 projecting from cam 18a, and cam surface 40 engages pin 41 projecting from cam 18b. In general operation, as shown in FIGS. 1 and 3A, initial raising of release hand lever 27 spreads lever arms 23a and 23b of respective cams 18a and 18b with equal and opposite angular displacement causing respective cam surfaces 20a and 20b to disengage surfaces 21a and 21b, coplanar in pawl 13 and links 16, and continued raising of release hand lever 27 causes engagement of pin 32 with end 42 of slot 31 causing bolt 25 to move pawl 13 out of engagement, as shown in the left side of FIG. 3A, against tension spring 24, as accommodated by slot clearance 43 in links 16 relative to central shouldered bushing boss 44 on bolt 26.

With added reference to FIG. 4, identical slots 45 in lower side bracket plates 12a and 12b provide lateral and verical clearance for respective bushings 46 and 47 on bolt 25 with the 90° included angle at the bottom of slot 45 accommodating a neutral position for pawl 13 upon disengagement from teeth 14 of sector 15. When the seat back has been adjusted to exact desired angular position and hand lever 27 is returned to its normal position, pawl 13 can initially float angularly to any extent necessary to full engagement with teeth 14 as shown in the right side of FIG. 3A at whatever exact position they may be on either side of neutral. Continued return of the release hand lever toward its normall position, due to tension of spring 22, causes arcuate return of cam surfaces 20a and 20b toward engagement with pawl surfaces 21a and 21b while pins 39 and 41 follow respectively hand lever extension surfaces 38 and 40 until one or the other of surfaces 20a or 20b (seldom both simultaneously) reaches contact position with respective surface 21a or 21b at which time arcuate movement of the engaging cam is arrested while arcuate travel of the other cam continues until its pawl engagement occurs at which time pawl 13 is locked against displacement in either direction.

Figure 3B:
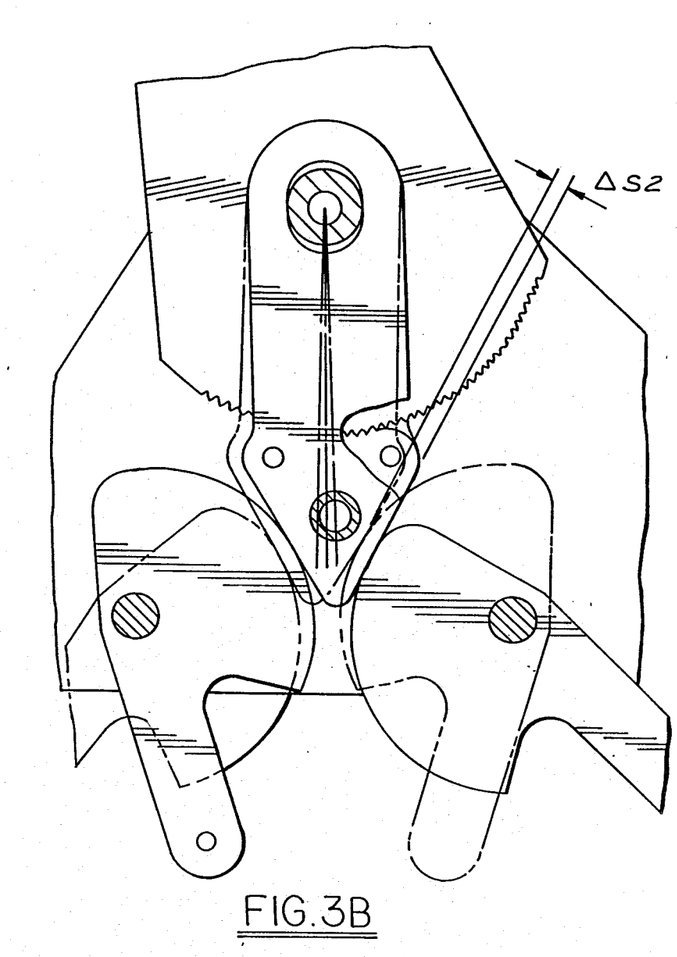
FIG. 3B is a similar view illustrating the range of arcuate pawl displacement.

Fine readjustment within a range of approximately 3°, as indicated by ΔS2 in FIG. 3B, may be effected, if desired, while the pawl and sector teeth are fully engaged by releasing the cam engagement through hand lever movement short of extending pretensioned spring 24. When exact desired readjustment through seat back and sector movement has been reached, cam reengagement will securely retain the exact new seat back position.

In the chance event that initial adjustment of the seat back sector results in tooth tip engagement of sector and pawl teeth blocking normal full tooth engagement, a slight movement of the seat back and sector end 15, to the extremity of bushing 47 engaging the side of slot 45 if necessary (see FIG. 4), will cause disengagement for completion of full tooth engagement, after which exact readjustment may be effected as described above.

Since the main pivotal axis 11 for brackets 10 and 12 forms a center for sector teeth 14 as well as pawl 13 for any position of engagement, including exact incremental engagement for fractional tooth pitch displacement on either side of neutral for any precise position of upper bracket 10 relative to lower bracket side plates 12a and 12b, slots 43 need to provide clearance only for radial movement along the center line of pawl 13 and links 16.

Figure 13:
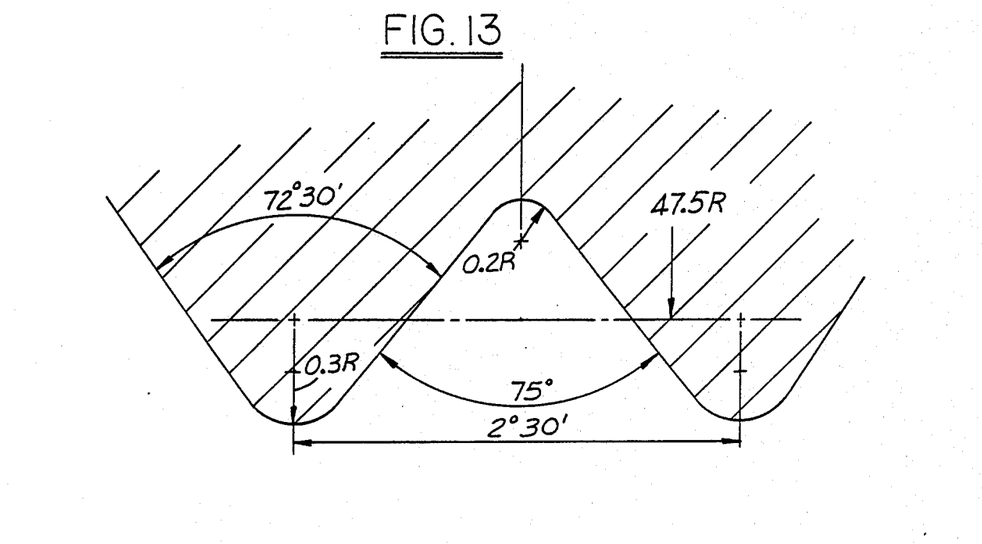
FIG. 13 is a fragmentary greatly enlarged view of the tooth form eployed in the sector plate illustrated in FIG. 3.
Figure 14:
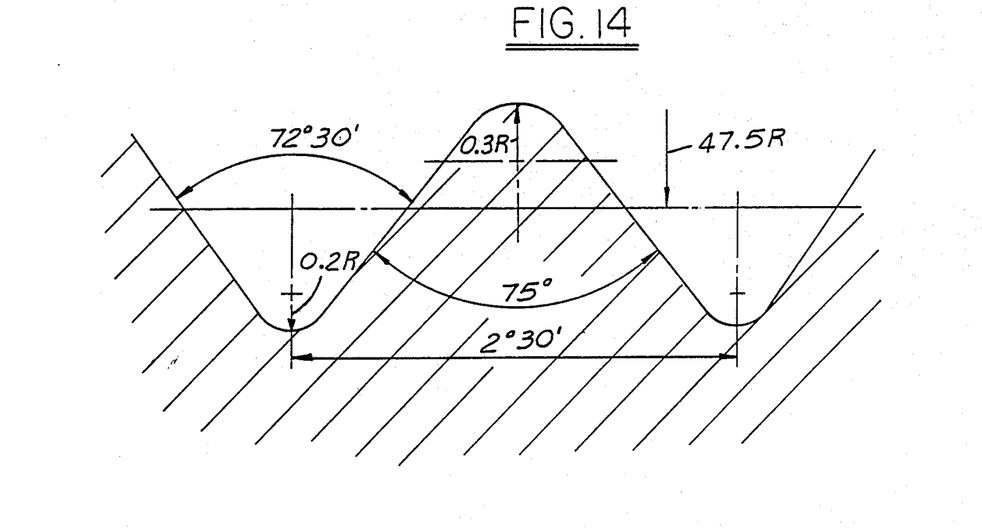
FIG. 14 is a corresponding enlarged matching tooth form of the pawl illustrated in the assembly of FIG. 3.

The required radial movement to accommodate complete tooth disengagement for seat back adjustment, shown as ΔZ in FIG. 3A, is a function of tooth form, pitch and tip radius, as shown in FIGS. 13 and 14. The cam radial surface retraction ΔS1 to match ΔZ for the 30° half angle involved is equal to ½ ΔZ times cos. 30°. The sum of ΔS1, and ΔS2 establishes the required total cam displacement from R MIN. to R MAX. as illustrated in FIG. 7.

Figures 5, 6, 7, 7A:
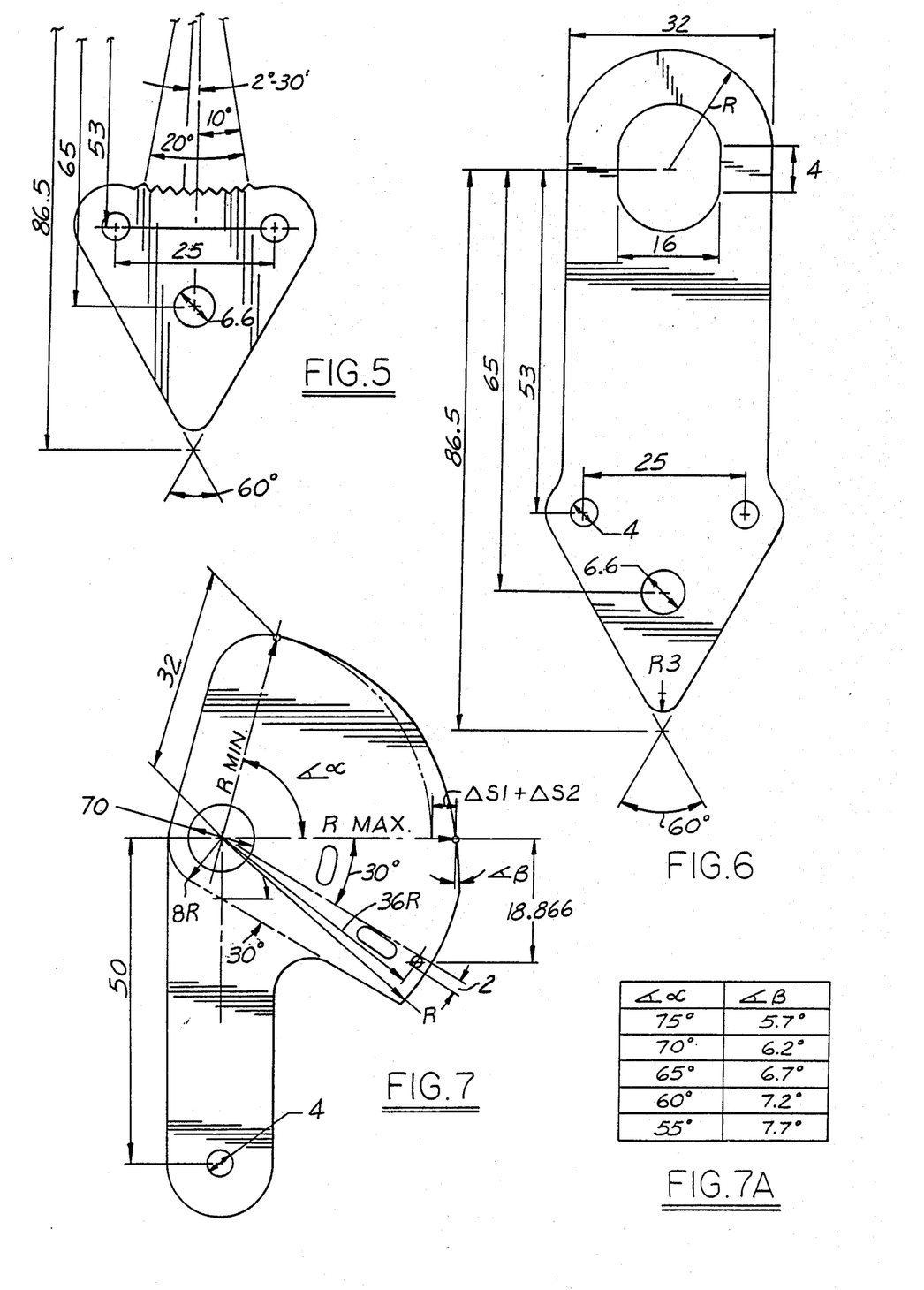
FIG. 5 is an enlarged view of the toothed latch pawl element per se illustrated in the assembly view of FIG. 3.
FIG. 6 is a corresponding enlaraged view of one of the link elements per se illustrated in the assembly view of FIG. 3 for mounting the pawl.
FIG. 7 is an enlarged view of one of the two identical cam lever elements per se illustrated in the assembly view of FIG. 3.
FIG. 7A is a chart of cam arcs for different rates of cam rise.
Figure 8:
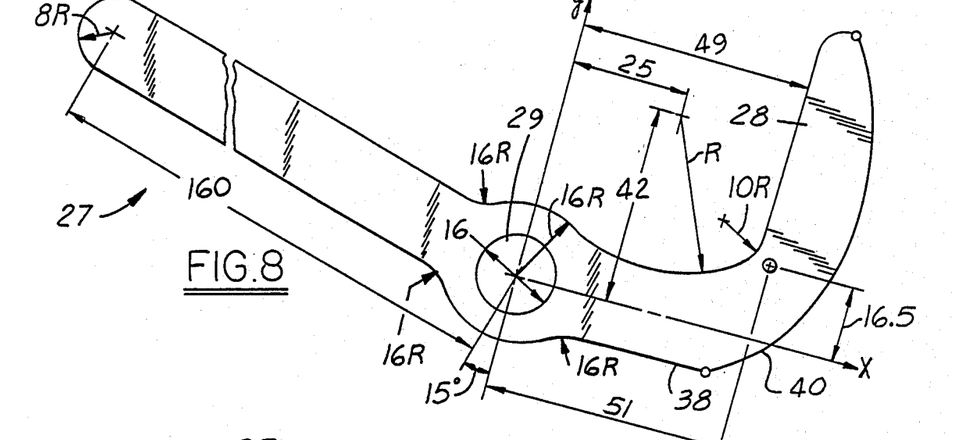
FIG. 8 is a detailed view of the handle element per se illustrated in the assembly view of FIG. 1.
Figure 9:
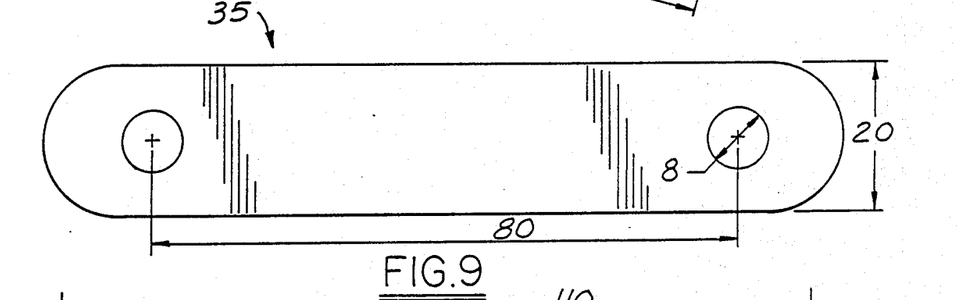
FIG. 9 is a side elevation of a connection link detail.

Such displacement is effected through a cam curvature having uniform radial progression vs. angular progression with the radial progression rate corresponding to angle $\beta$ as shown in FIG. 7. This will produce the required total cam displacement within variable total angular ranges as indicated in the chart of FIG. 7A with corresponding variable rate angles $\beta$ chosen to approximately match the "angle of friction" for the prevailing cam and pawl materials and surface conditions.

As shown in FIG. 3, the line normal to pawl surface 21b at the point of contact extends past the pivot center 19b at angle $\beta$ so that a force along such line resulting from sector/pawl tooth load will create a moment in the cam opening direction which inhibits any creeping of the cam in a locking direction under reversible seat back loading after initial cam seating and faciliates manual cam release for seat back adjustment with a force substantially limited to overcoming the tensile preload of springs 22 and 24.

With dimensions as shown in millimeters on the detailed part drawings for a preferred hinge embodiment, a constnt locking angle results for any pair of cam positions within the extremities of cam arc having a uniform progressive rise which, under opposite arcuate displacement from the neutral position illustrated, will accommodate an arcuate displacement of pawl 13 on either side of its neutral position sufficiently to fully engage the matching teeth of sector 14 for any precise relative position of upper bracket 10 relative to lower bracket 12a and 12b. This effectively provides a truly continuously variable adjustment for the seat back bracket 10 as distinguished from incremental adjustment of conventional prior art constructions based on single tooth pitch angularity.

With reference to the FIG. 7A chart, different cam arcs are shown for different effective friction coefficients which may be determined empirically for materials and surface conditions of particular cam and pawl constructions employed, each providing the same cam rise to accommodatae the 3° range of pawl angular displacement illustrated in FIG. 3B.

With reference to FIGS. 1, 2 and 3, in assembling the hinge bolt 26 passes through a shoulder bushing having an enlarged central boss 44 forming the pivot for upper sector plate bracket 10 with progressive steps 48 and 49 on either side respectively engaging elongated slots 43 in links 16 and lower bracket side plates 12a and 12b with outer washers 50 and retaining nut 51 completing the main pivotal hinge connection.

A sub-assembly of pawl 13 sandwiched between links 16 is integrally connected by dowel pins 17 presss fit to establish a rigid sub-assembly component with finish ground flats 21a and 21b, at the 60° angle shown in FIGS. 5 and 6, providing coplanar surfces for engagement by cam faces 20a and 20b which are dimensioned to engage outer links 16 as well as pawl 13 in order to minimize unit stress loading. Bushings 46 and 47 serve as spacers for minimum clearance-free pivoting of links 16 relative to lower bracket side plates 12a and 12b as well as release link 30 and clearance passages for hand lever extension 28.

Figure 10:
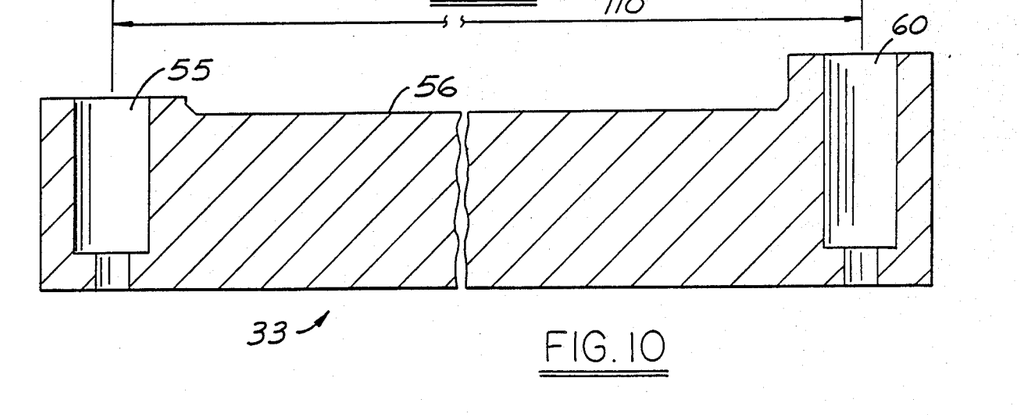
FIG. 10 is an enlarged sectional plan view of a retention link per se illustrated in the side elevation assembly of FIG. 1.

Bolt 36 provides a main bearing pivot for cam 18a with the same surfce passing through a mounting hole in bracket side plate 12a and having a reduced end passing through a corresponding smaller mounting hole in bracket plate 12b and a matching hole in connection link 35. Shoulder 52 provides a spacer for mounting hand lever handle 27 on a reduced boss pivot 53 with stem 54 engaging bore 55 in retention link bar 33 which, as illustrated in FIG. 10, is recessed at 56 to provide a clearance passage for release link 30. In production, a lighter section link bar may be employed in combination with stiffening ribs in side plate 12a in order to provide adequate rigidity in the assembly against distortion under load.

Figure 11:
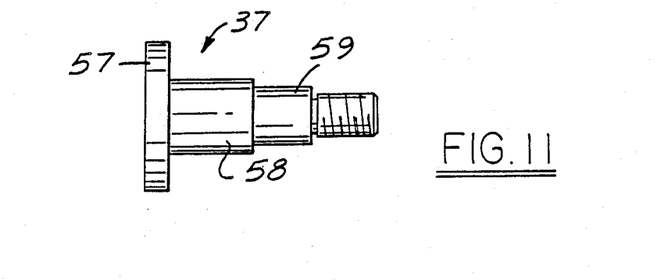
FIG. 11 is a side elevation of one of the shoulder bolts per se employed as an attachment and guide in the assembly of FIG. 1.

Bolt 37, illustrated per se in FIG. 11, has head 57, as shown in FIG. 1, extending in the same plane as shoulder 52 of bolt 36 with bearing surface 58 extending through bracket plate 12a forming the bearing surface for cam 18b, and with reduced extension 59 passing through matching mounting hole in bracket plate 12b and link 35 to complete a sandwich tension linkage for resisting forces imposed on cam surfces 20a and 20b and retaining pawl 13 against displacement under back rest loading.

Figure 12:
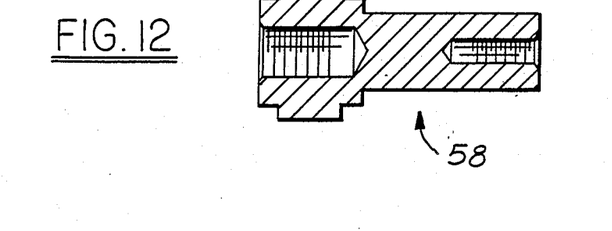
FIG. 12 is an enlarged sectional view of one of the assembly bolts per se for lower bracket plates as illustrated in FIG. 3.

With reference to FIGS. 10 and 12, counterbore 60 is engaged by stem 61 of bolt 58 with boss 62 serving as a spacer for shoulder engagement at 63 of respective bracket plates 12a and 12b. As shown in FIG. 1 and 3, a similar spacer 64 without a stem corresponding to 61 serves as a mounting connection for bracket plates 12a and 12b.

Following is a summary of the geometry which has proven in tests to meet all operational requirements under multiple cycle reverse seat back loading without any creep of the cams that might otherwise either increase required handle release effort or gradually change the adjusted seat back angle:

1. 60° included angle of pawl 13 flat engagement surfaces 21a and 21b;
2. 45°-45°-90° isosceles triangular relation of cam pivot centers 19a and 19b and the neutral pitch point of tooth engagement;
3. A projected intersection of neutral pawl engagement surfaces 21a and 21b substantially on a line connecting pivot centers 10a and 19b;
4. 65°-65°-50° isosceles triangular relation of cam pivot centers 19a, 19b and the main hinge and sector pivotal center 11;
5. Pawl tooth from of 25° included angle and 2½° pitch spacing;
6. 3° pawl displacement through variable cam/pawl engagement;
7. Uniform progression of cam rise for equal increments of angular displacement;
8. Cam rise, as shown in FIG. 7, at an angular rate closely approximating the empirical angle of friction for the engaging cam and pawl surfaces, e.g., within a range of 5° to 8° as indicated in chart 7A;
9. Line of reaction normal to the contacting cam and pawl surfaces at the point of engagement passing each cam pivot on the side which provides an unlocking moment in response to pawl loading from seat back imposed tooth pressure;

DESCRIPTION OF SECOND PREFERREDD EMBODIMENT

Figure 15:
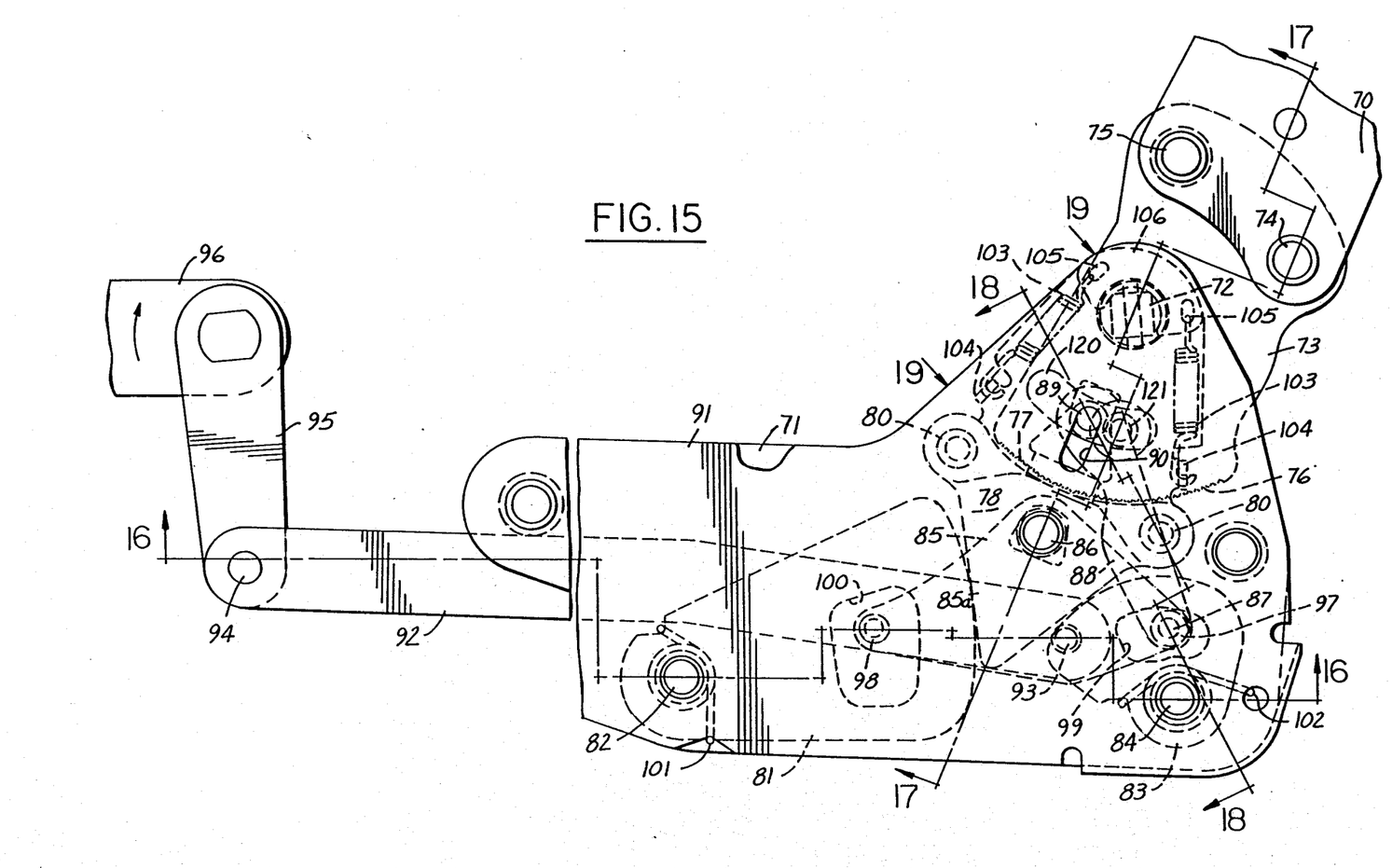
FIG. 15 is a side elevation of a hinge assembly illustrating a second preferred embodiment of the present invention.
Figure 16:
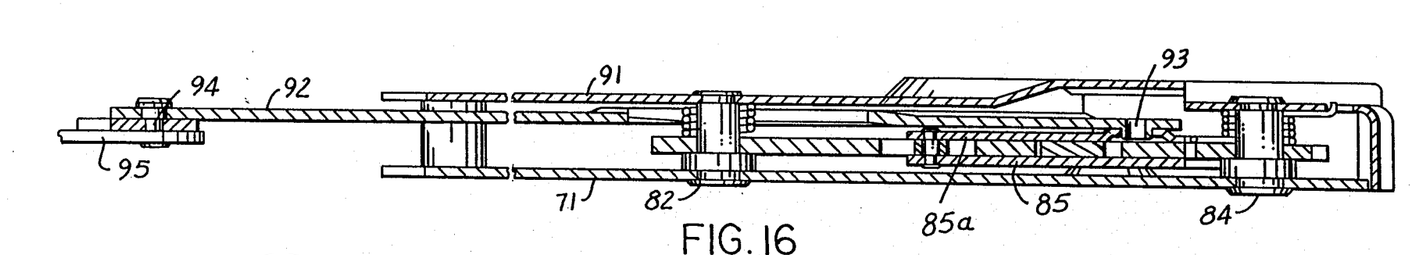
FIG. 16 is a sectional view taken along the line 16—16 of FIG. 15.

With reference to FIGS. 15-20, the principal components of the second embodiment include upper bracket 70; lower bracket 71; connecting pivot 72; intermediate plate 73, secured to upper bracket 70 by pin 74 and rivet 75, provided with sector teeth 76 engaged by teeth 77 of pawl gear inset 78, in turn secured to pawl plate 79 by pawl rivets 80 and pivotally connected at main pivot 72; cam 81, pivoted at 82 to lower bracket 71; cam 83, pivoted at 84 to lower bracket 71; inner and outer pawl retaining plates 85, 85a, pivotally connected at 86 to lower bracket 71 and outer plate 91, and provided with pivot connection 87 for link 88, in turn pivotally connected at 89 to pawl plate 79, with link pivot 89 confined by slot 90 in outer plate 91 to a linear path in alignment with main pivot 72 and retaining plate pivot 86; connecting link 92, pivotally connected at 93 to outer retaining plate 95a, actuated through pivotal connection 94 by lever 95 and handle 96 to cause pivotal actuation of outer retaining plate 85a together with inner retaining plate 85 with simultaneous arcuate movement about pibot 86 of link pivot 87, coaxial roller 97, and roller 98, said rollers being adapted respectively to engage slot surface 99 in cam 83 and slot surface 100 in 81 to retract them from engagement with pawl gear inset 78, followed by link 88 retraction of pawl plate 79 and pawl gear inset 78 teeth 77 from engagement of intermediate plate teeth 76. Upon freeing release handle 96 for return to normal position as shown in FIG. 15, springs 103, engaging ears 104 in pawl plate 79 and apertures 105 in spring plate 106, return pawl gear inset 78 teeth 87 into engagement with sector teeth 76 and torque spring 101, anchored in a notch in outer plate 91, returns cam 81 to engagement with pawl gear inset 78; likewise torque spring 102 anchored in a hole in outer plate 91, returns cam 83 into engagement with pawl gear inset 78.

Figure 20:
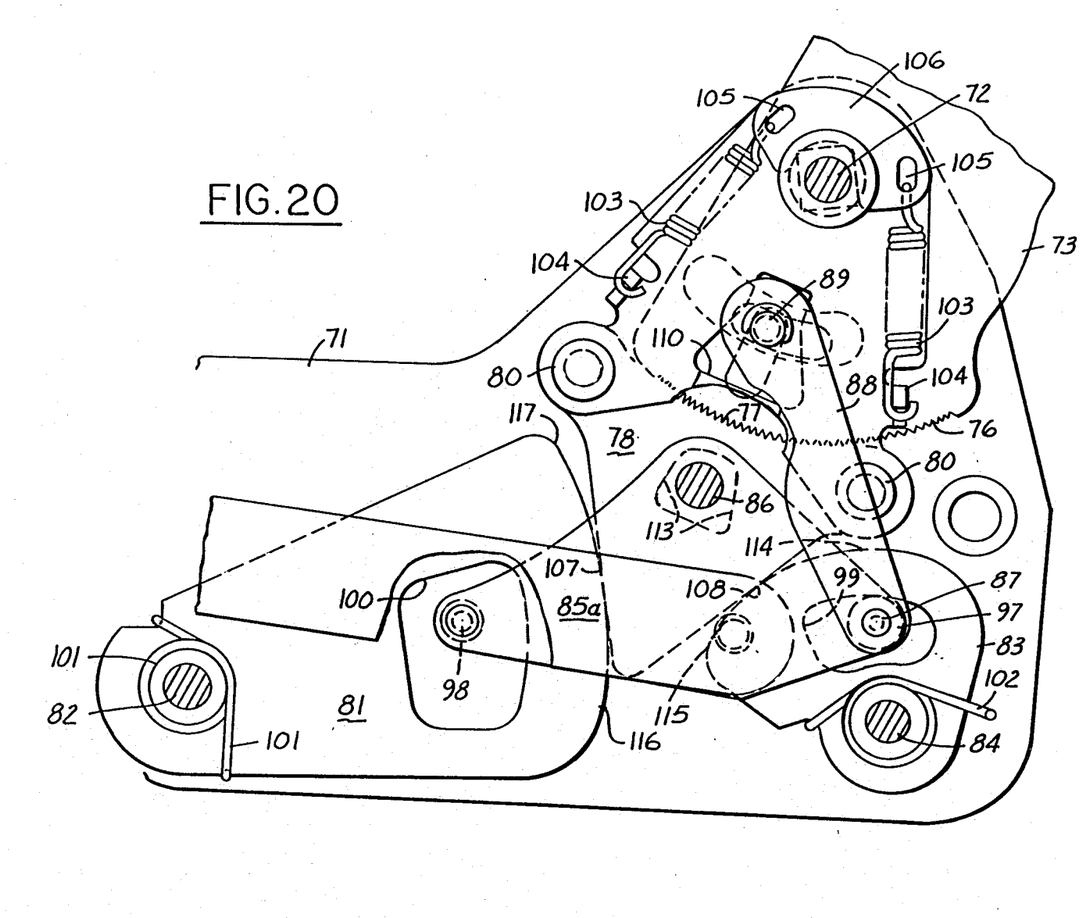
FIG. 20 is a fragmentary enlarged side elevation corresponding to FIG. 15 with cover plate omitted to clarify the disclosure of internal elements.
Figure 21:
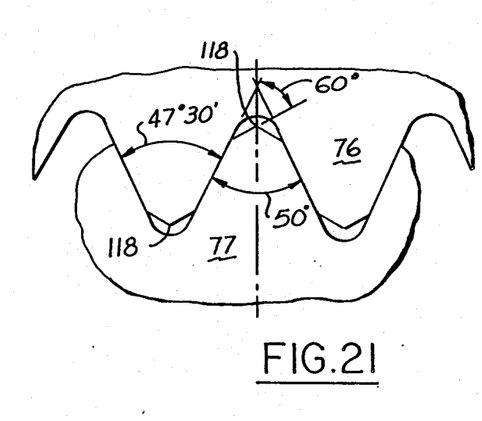
FIG. 21 is an enlarged fragmentary schematic view illustrating the interengagement of pawl and sector teeth.

With reference to the FIG. 20 enlarged fragmentary view corresponding to FIG. 15, with outer plate omitted to clarify the operating elements, adjustment of a seat back attached to upper bracket 73 involves arcuate retraction of cams 81 and 83 in a counterclockwise direction from engagement with pawl gear inset 78 followed by radial retraction of inset 78 disengaging inset teeth 77 from sector teeth 76 while seat back and upper bracket 73 are adjusted by the occupant to exact desired position. Initial return of pawl gear insert 78, prior to reengagement of cams 81 and 83, will accommodate its lateral float in either direction from the neutral position shown at least to the extent of one tooth, to find exact matching position with sector teeth 76, whereupon reengagement of cams 81 and 83 with respective flanks 107 and 108 of inset 78, if offset in either direction, will lock the sector teeth 76 and upper bracket 73 in the precise adjusted position.

In the neutral position of insert 78 and cams 81 and 83 as shown in FIG. 20, there is clearance for respective rollers 97 and 98 within corresponding cam slots which would accommodate cam displacement in either direction as required for offset positions of inset 78 with cams in retaining position. Initial retraction movement of connecting link 92 and rotation of retaining plates 85, 85a will take up such clearance for engaging slot surfaces 99 and 100 to release respective cam engagement with inset 78 prior to engagement of link pivot 89 with pawl plate shoulder 110, to disengage the pawl teeth 77 from sector teeth 76.

Figure 17:
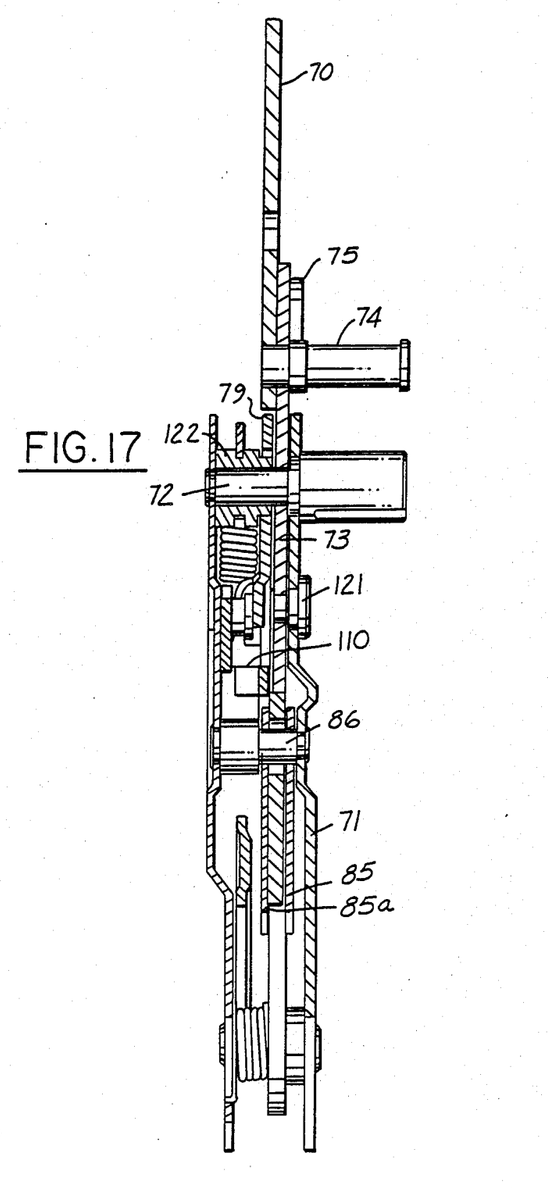
FIG. 17 is a sectional view taken along the line 17—17 of FIG. 15.
Figure 18:
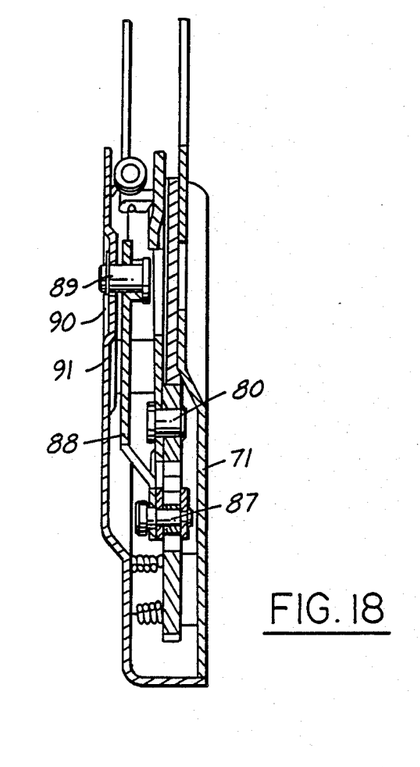
FIG. 18 is a sectional view taken along the line 18—18 of FIG. 15.
Figure 19:
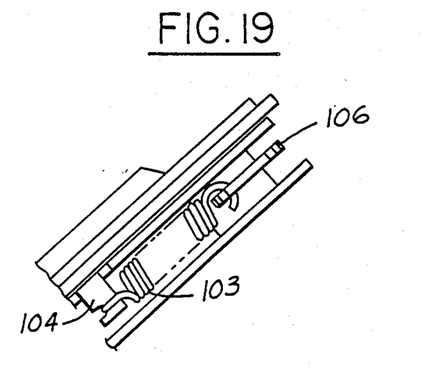
FIG. 19 is a fragmentary view taken along the line 19—19 of FIG. 15.
Figure 22:
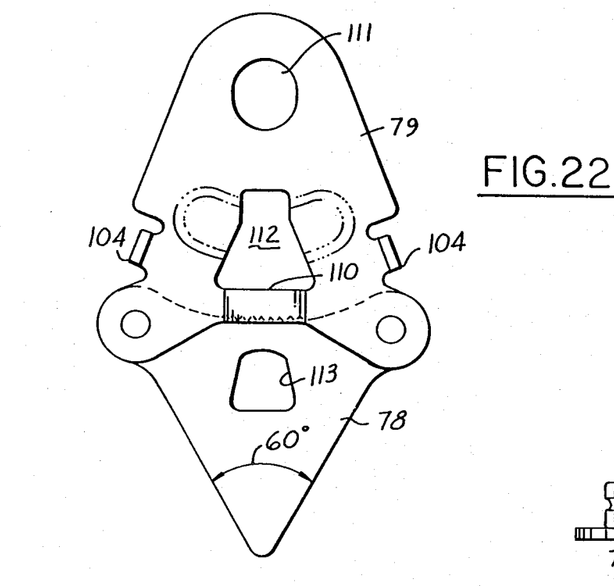
FIG. 22 is an enlarged detail view of the toothed pawl component per se.
Figure 23:
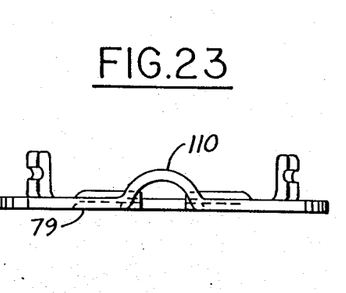
FIG. 23 is an end view of the FIG. 22 component taken along the line 23—23 of FIG. 22.

With reference to FIGS. 17, 22 and 23, shoulder 110 is shown as an arch element formed in the body of pawl plate 79. Elongated slot 111 in pawl plate 79 to accommodate radial displacement from main pivot 72 is also shown in FIG. 22. Tapered slot 113 in pawl gear inset 78 serves to accommodate arcuate displacement for tooth engagement offset from neutral while also serving to confine reengagement to teeth closet to the neutral position.

With reference again to FIG. 20, the centers of pivots 72 and 76 extend on a line 23° clockwise of vertical. Assuming vertical as a reference line, the effecive arc of cam 83 extends from point 114, 8° counterclockwise from vertical to a point 115, 60° counterclockwise from point 114. Effective rise of cam 81 extends from point 116, 2° clockwise of horizontal, to a point 117, 35° counterclockwise of point 116. In the case of each cam, the line of force extending normal to the inset surface 107 or 108, at the point of cam contact, will extend at approximately a 7° locking angle relative to either cam pivot. In the case of backward pressure on the seat by the occupant, the line of force on cam 81 will create a moment in a release direction tending to minimize the required force of handle displacement and release force required between roller 98 and cam surface 100 to effect cam release. Likewise, if occupant back pressure is absent or light and return spring pressure on the seat back creates the predominate force on inset 78, the line of force normal to surface 108 at the point of contact will extend at approximately 7° on the side of pivot 84 creating a moment in a release direction aagain minimizing the required force between roller 97 and cam surface 99 to effect cam release.

Upon manual release of handlel 96, progressive return of connecting link 92 will first permit springs 103 to return inset 78 to a tooth engagement with sector teeth 76 in whatever precise adjusted position prevails, with lateral float accommodated by spring plate 106 sliding at its inner bearing surface. Sharp points of 118 of inset and sector teeth, having an obtuse included angle of 120°, serves to avoid tip to tip blocking of full meshing engagement and virtually assuring proper guidance of teeth 77 to either side of tip aligned position. Tooth angles of 50° and 47° 30' as shown, have been found most satisfactory for this embodiment in accordance with a 2.5° angular pitch in the sector teeth.

As mentioned above, tapered surfaces 113 in the inset 78 aperture serve to center the inset 78 through engagement with pivot 86 during retraction of the pawl from engagagement so as to assure reengagement within a single tooth lateral range of displacement. Slot 120 and lower bracket 71 engaged by stop pin 121 anchored in intermediate plate 73 serves to limit arcuate adjustment range of upper seat back bracket 70.

While the basic principal of dual cam locking of a floating pawl to accommodate infinitely variable adjustment is employed in both embodiments, as well as issued U.S. Pat. No. 4,591,207, different linkages, actuating means, and cam rotation directions are possible within the scope of the invention; and more specifically, with reference to the two embodiments of the present disclosure, are possible in the positioning of a pawl radially pivoted on the main pivot of the seat back.

We claim:

1. Assembly of pivotally connected elements characterized by continuously variable adjustment means for locking the relative angular relation of said elements comprising, toothed convex circular arc sector means on one of said elements and matching interengageable toothed means on the other of said elements, mounting means for said other toothed means accommodating complete disengagement of said respective toothed means during adjustment of said relative angular relation, said mounting means including means for accommodating full matching tooth engagement of said respective toothed means for any continuously variable adjustable angular relation of said elements, and cam means on said other of said elements engageable with said other of said toothed means after establishing full matching engagement of said respective toothed means for locking said respective toothed means against any relative displacement in said relative angular relation of said elements, said assembly being further characterized by said mounting means for said other of said toothed means including a pivotal connection coaxial with the pivot of said pivotally connected elements, said pivotal connection having radial displacement clearance to accommodate said disengagement.

2. The assembly of claim 2 wherein said pivotally connected elements comprise bracket members of a hinge adapted for use as an adjustable seat back hinge, and wherein said other of said toothed means comprises a pawl with multiple teeth extending along a concave circular pitch arc, said convex circular arc sector means and said pawl extending in flat coplanar relation, a pair of side links rigidly attached to said pawl providing said pivotal connection for said other toothed means extending on either side of said sector, each link having a radial slot providing said radial displacement clearance.

3. The assembly of claim 2 wherein said pawl is provided with a pair of angularly related cam engageable side edge flats.

4. The assembly of claim 3 wherein said side edge flats extend with an included angle therebetween in the order of 60°.

5. The assembly of claim 4 wherein said ccam means comprise a pair of cams pivotally mounted on said other of said elements, each engaging respectively one of said side edge flats when said other toothed means has reached said full maatching engagement.

6. The assembly of claim 5 wherein each of said pair of side links is provided with angularly related cam engageable side edge flats which are coplanar with said pawl's cam engageable side edge flats.

7. The assembly of claim 5 wherein each of said cams is provided with an eccentric surface for accommodating an infinitely variable lateral displacement of said pawl to match any angular relative relation between said pivotally connected elements.

8. The assembly of claim 5 wherein a line normal to either of said side edge flats at the point of said engagement passes the pivotal axis of said pawl at a constant locking angle within a range in the order of 5°–8° from a line extending between said point and the pivotal center of said cam by which pressure at said point of contact establishes a moment of force in an engagement releasing direction.

9. The assembly of claim 5 wherein tooth form of the respective toothed means provide engaging faces disposed at approximately a 75° included angle.

10. The assembly of claim 6 wherein the thickness of each cam is approximately equal to the combined thickness of said pawl and associated side links.

11. The assembly of claim 5 wherein the form of each cam engagement face provides a uniform increasing radial progression from its pivotal axis for equal increments of angular displacement.

12. The assembly of claim 10 wherein said cams and pawl/links subassembly extend in flat coplanar surfaces between a pair of side plates which form the other of said pivotally connected elements.

13. The assembly of claim 12 including connection link means for holding said side plates in close assembled relation with said cam and pawl side link surfaces to prevent separation therebetween.

14. The assembly of claim 8 wherein said cam engagement surface extends within an arcuate range of approximately 55° to 75° inversely proportional to said locking angle.

15. The assembly of claim 14 wherein said cam engagement surface provides a total displacement sufficient to accommodate full tooth engagement plus approximately 3° of angular pawl displacement.

16. The assembly of claim 15 wherein said sector and pawl teeth are provided with a 2½° angular pitch.

17. The assembly of claim 5 wherein the center of said cam pivots and central neutral tooth pitch point lie in approximately an equilateral right angle triangle.

18. The assembly of claim 8 wherein said locking angle corresponds approximately to the angle of friction for the engaging surface of said cm and pawl under prevailing operating conditions.

19. The assembly of claim 1 wherein said pivotal connected elements comprise bracket members of a hinge adapted for use as an adjustable seat back hinge, and wherein said other of said toothed means comprises a pawl with multiple teeth extending along a concve circular pitch arc, said convex circular arc sector means and said pawl extending in flat coplanar relation, a single side link rigidly attached to said pawl providing said pivotal connection for said other toothed means extending on one side of side sector, said link having a radial slot providing said radial displacement clearance.

20. The assembly of claim 19 wherein said pawl is providded with a pair of angularly related cam engageable side edge flats.

21. The assembly of claim 20 wherein said side edge flats extend with an included angle therebetween in the order of 60°.

22. The assembly of claim 21 wherein said cam means comprise a pair of cams pivotally mounted on said other of said elements, each engaging respectively one of said side edge flats when said other toothed means has reached said full matching engagement.

23. The assembly of claim 22 wherein each of said cams is provided with an eccentric surface for accommodating in infinitely variable lateral displacement of said pawl to match any angular relative relation between said pivotally connected elements.

24. The assembly of claim 22 wherein a line normal to either of said side edge flats at the point of said engagement passes the pivotal axis of said pawl at a locking angle of approximately 7° from a line extending between said point and pivotal center of said cam by which pressure at said point of contact establishes a moment of force in an engagement releasing direction.

25. The assembly of claim 22 wherein the tooth form of the respective toothed means provide engaging faces disposed at approximately a 50° included angle.

26. The assembly of claim 22 wherein the form of each cam engagement face provides a uniform increasing radial progression from its pivotal axis for equal increments of angular displacement.

27. The assembly of claim 24 wherein one of said cam engagement surfaces extends with an arcuate range of approximately 52° and the other with an arcuate range of approximately 37°, said later cam surface extending at a relatively greater radial distance in order to effect substantially equal radial displacement of the paawl contact point over the respective arcuate ranges of said cam surfaces.

28. The assembly of claim 27 wherein the cam rise on each of said respective cam surfaces produces either pawl release or pawl engagement through angular movement in a like direction.

29. The assembly of claim 27 wherein said cam engagement surface provides a total displacement in either direction from the neutral position shown at least to the extent of one tooth to accommodate exact matching position with said toothed sector means when in its exact desired position.

30. The assembly of claim 29 wherein said sector and pawl teeth are provided with a 2½° angular pitch.

31. The assembly of claim 22 wherein each of said respective pivoted cams is provided with an internal through slot opening, means pivotally mounted on said other of said elements provided with respective projecting members for engaging the perimeter of each slot to effect release movement of said cam means, handle actuated linkage means for actuating said last pivoted means, and spring means provided for biasing each of said pivoted cam means toward pawl engagement.

32. The assembly of claim 19 wherein said link attached to said pawl is provided with a pair of extension springs, and plate means connected to one end of each of said springs slidably engaging the pivotal connection for said bracket members to accommodate lateral displacement of said pawl.

33. The assembly of claim 22 wherein a link with pivotal connection to said handle actuated linkage is in turn pivotally connected to said pawl link with means for effecting tooth disengagement of said pawl following preliminary cam disengagement of said pawl through release handle actuation.

* * * * *

UNITED STATES PATENT AND TRADEMARK OFFICE
CERTIFICATE OF CORRECTION

PATENT NO. : 4,884,845

DATED : December 5, 1989

INVENTOR(S) : Gerhard Schmale, Frank Gerich and Rucolph C. Barda

It is certified that error appears in the above—identified patent and that said Letters Patent is hereby corrected as shown below:

Column 5, line 57, "10a" should read --19a--;

Column 7, line 16, "closet" should read --closest--;

Column 8, Claim 2, line 1, "claim 2" should read --claim 1--.

Signed and Sealed this

Sixteenth Day of July, 1991

Attest:

HARRY F. MANBECK, JR.

*Attesting Officer*  *Commissioner of Patents and Trademarks*